Sept. 6, 1960

L. F. HERTE

RECORD DEVICE 2,951,304

Filed Sept. 2, 1958

6 Sheets-Sheet 1

INVENTOR
LAWRENCE F. HERTE

BY Charles P. Boberg

ATTORNEY

Sept. 6, 1960 L. F. HERTE 2,951,304

RECORD DEVICE

Filed Sept. 2, 1958 6 Sheets-Sheet 3

Sept. 6, 1960    L. F. HERTE    2,951,304

RECORD DEVICE

Filed Sept. 2, 1958    6 Sheets-Sheet 4

Sept. 6, 1960 L. F. HERTE 2,951,304

RECORD DEVICE

Filed Sept. 2, 1958 6 Sheets-Sheet 5

Sept. 6, 1960 L. F. HERTE 2,951,304

RECORD DEVICE

Filed Sept. 2, 1958 6 Sheets-Sheet 6

United States Patent Office 2,951,304
Patented Sept. 6, 1960

2,951,304

RECORD DEVICE

Lawrence F. Herte, Endicott, N.Y., assignor to International Business Machines Corporation, New York, N.Y., a corporation of New York Filed Sept. 2, 1958, Ser. No. 758,192

2 Claims. (Cl. 40—158)

This invention relates to record cards of the kind employed in tabulating machines and the like, and it relates particularly to record cards which are adapted to hold photographic film inserts or transparencies.

Business organizations have been making increasingly heavy demands for record cards equipped with film mounting means. The mounting means must be of such a nature that it will not interfere with the normal tabulating uses of the card; nor may it interfere with the optical projection or photographic reproduction of the film insert in the card. Current methods of manufacturing these film insert cards are not capable of meeting the prospective demand for such articles. What is needed at present is a type of film mounting record card which is adapted for mass production and yet is capable of meeting the exacting requirements that will be imposed upon it in service. A principal object of this invention is to provide such a card.

Another object of the invention is to provide a novel method of manufacturing film insert record cards which avoids the necessity of utilizing a punch and die or the like to form the film receiving aperture in the card, or of positioning a separate cover sheet in the aperture to maintain a flush surface with the rest of the card, or of using an adhesive which requires the application of heat or a solvent to mount the film in the card.

According to one feature of the invention, the material occupying the area of the card which is to receive the film insert is scored or similarly weakened along the borders of said area to provide an easily removable portion of the card material, variously referred to in the art as a "chip," "punchout" or "knockout." A pressure-sensitive adhesive film mounting strip or sheet is positioned on the card to overlap the removable scored portion of the card. The scored, removable portion of the card remains flush with the rest of the card and supports the adhesive strip, so that no special cover sheet is necessary to protect the adhesive strip or to render the card suitable for tabulating purposes. When a film is to be inserted in the card, the user merely detaches the scored portion of the card, leaving an aperture or "window" bordered by the pressure-sensitive adhesive strip for receiving the film. The removable portion of the card is coated or treated with a protective substance so that it can be peeled away or pushed out without leaving paper fibers clinging to the adhesive surface of the film mounting strip. This type of card can be produced cheaply and in large quantities without impairing the accuracy of its construction.

Other objects, features and advantages of the invention will be pointed out in the following description and claims and illustrated in the accompanying drawings, which disclose, by way of examples, the principle of the invention and the best mode, which has been contemplated, of applying that principle.

Figure 1:
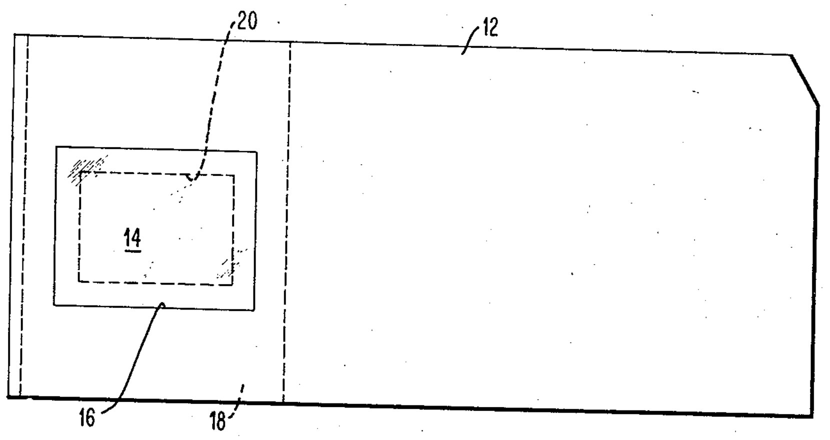
Fig. 1 is a back view of a film insert card in its completely assembled form, with the film or other insert mounted therein.

Before describing the invention in detail, a preliminary description of its end product, the completely assembled record device, will be given in conjunction with Figs. 1 and 2. The device illustrated in Fig. 1 is designed for use as a combined tabulating and photographic record, and it resembles devices of this general type which are in common use at the present time. Basically, the illustrated record device comprises a tabulating card 12 or the like in which a film 14 or similar object is mounted. The film 14 usually contains a developed photographic image on a transparent background for use in making optical projections or photographic reproductions. In some instances the film 14 may comprise an opaque photograph, or it may have a layer of undeveloped photosensitive emulsion on which an image can be developed by photographic methods. Record cards of this general type are adapted for use in standard tabulating machines or other business machines employing card reading instrumentalities, and the film 14 is so mounted on the card 12 that it will not interfere with the normal uses of this card, such as sorting, tabulating and the like.

Figure 2:
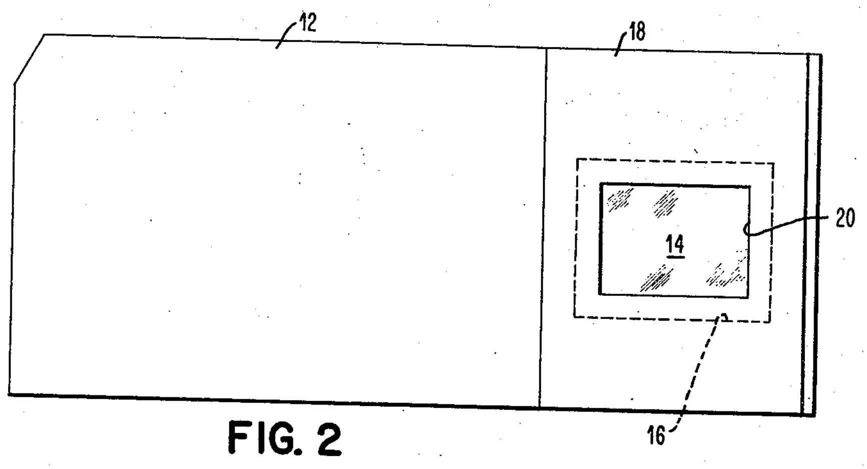
Fig. 2 is a front view of the card shown in Fig. 1.

In assembling the record card shown in Figs. 1 and 2, the film 14 is inserted into a suitable aperture or "window" 16 in the card 12 and is held in place by an adhesive mounting means 18. Customarily the mounting means 18 comprises a sheet of very thin material such as acetate coated with a pressure-sensitive adhesive material. The adhesive sheet 18 covers the area of the card surrounding the aperture 16 and overlaps the boundary of this aperture to provide a mounting portion on which the film 14 may be placed. As the film 14 is inserted into the aperture 16, it adheres to the exposed mounting portion of the adhesive sheet 18. It is preferable that the adhesive material engage the film 14 at its marginal portions only in order that the mounting means will not interfere optically with the projection of the image. To this end, there is formed in the adhesive sheet an aperture 20 which is of smaller dimensions than, and located centrally of, the aperture 16 in the card 12. The aperture 20 thus defines the marginal film mounting area of the adhesive sheet 18.

In conventional practice the adhesive sheet 18 is made just large enough to occupy the area of the card immediately adjoining the film receiving aperture therein. However, according to one embodiment of the invention that will presently be described, the length of the adhesive sheet 18, as shown in Figs. 1 and 2, is made equal to the width of the card 12. While this uses more material than the conventional film mounting means, it expedites the manufacture of these cards on a large scale, as will be explained hereinafter.

Figure 3:
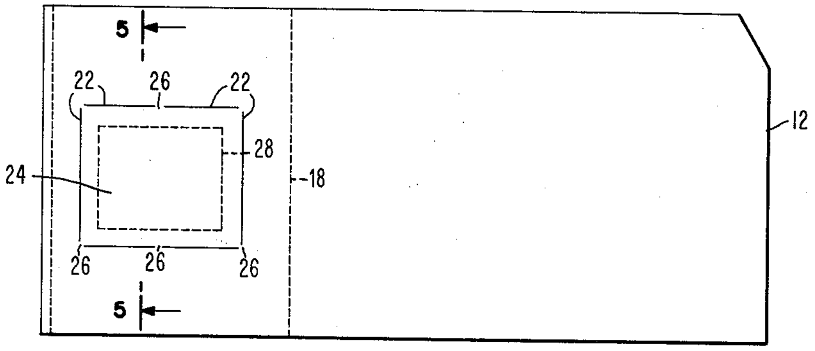
Fig. 3 is a back view of a record card constructed according to the invention before the removable portion of the card is detached.
Figure 4:
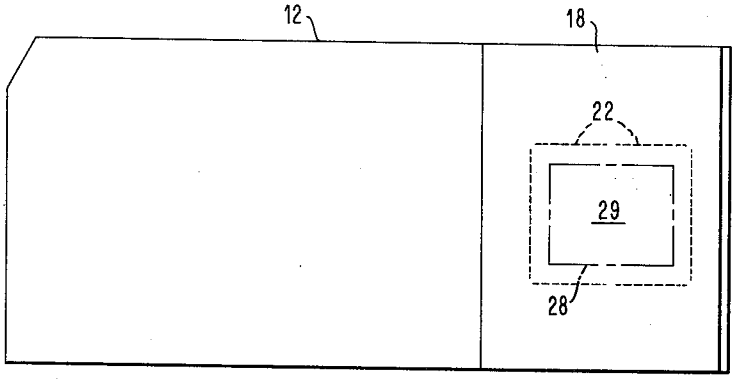
Fig. 4 is a front view of the card shown in Fig. 3.
Figure 5:
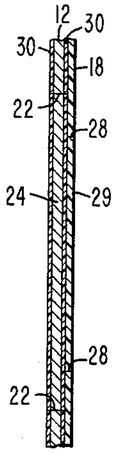
Fig. 5 is a section through this card taken on the line 5—5 in Fig. 3.

The principles of the invention are best illustrated in Figs. 3, 4 and 5, which show one form of the proposed card as it may be sold to the user. The area of the card 12 which is reserved for the reception of a film insert is bounded by lines of weakness 22 in the card material. The lines of weakness 22 are defined by discontinuous cuts, scores, slits or the like in the card material, located at the boundary where the edges of the film receiving aperture 16 (Fig. 1) will be when the card is made ready to receive a film. The portion 24 of the card material lying within the area bounded by the lines of weakness 22 will be referred to hereinafter as the "removable portion" 24 of the card 12. Various other terms commonly employed in the art, such as "chip," "punchout" or "knockout," also may be applied to the removable portion 24. As indicated in Fig. 3, the lines of weakness 22 extend for the greater part of the perimeter of the removable portion 24 and are separated from each other by very narrow connecting or retaining elements 26 of the card material which, until they are ruptured as described presently, will serve to hold the removable portion 24 in place.

The film mounting means 18 is applied to the front of the card 12, extending the full width of the card and overlapping the scored boundary 22 of the removable portion 24. The adhesive sheet 18 preferably is scored or otherwise weakened along the lines 28, Fig. 4, to provide a removable portion 29 in the sheet 18 which is of smaller dimensions than the removable card portion 24 and located centrally thereof.

Figure 6:
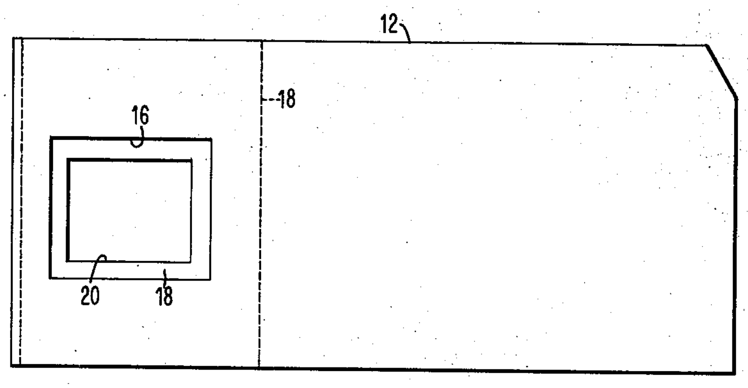
Fig. 6 is a back view of the card after the removable portion thereof has been detached and just prior to the reception of a film therein.

The removable portion 24 of the card 12 and the removable portion of the adhesive sheet 18 defined by the score lines 28 are so constituted that they can readily be removed or detached from the card by the application of a nonshearing stress thereto. By a "nonshearing" stress is meant a stress of a type other than that which would be produced by a punch or die designed to apply shearing force to the card material along the edges of the portion 24. For example, one may remove the portion 24 of the illustrated card 12 merely by "peeling" it off of the adhesive mounting sheet 18. The rupturable connecting elements 26 of the card material readily separate under such a stress, and the removable portion 24 is easily detached from the card 12 to leave a film receiving aperture 16, Fig. 6, in the card. A tearing action of this kind is considered to be a nonshearing stress. The scored portion 29 of the adhesive sheet 18 is similarly removed or may be merely pushed out to leave an aperture 20 in the sheet 18. The marginal portions of the adhesive sheet 18 which overlap the aperture 16 are effective to engage and retain the edge portions of the film 14, Fig. 1, when the latter is inserted into the aperture 16 of the card 12.

As already mentioned, Figs. 3 and 4 represent the record card as it customarily would be sold to users. The removable portion 24, so long as it is held by the rupturable connecting elements 26 at its edges, serves to maintain a flush surface with the rest of the card and also protects the thin adhesive sheet 18 from damage. The card 12 in this form may be used for its normal tabulating purposes, and it is not necessary that one utilize a protective cover sheet of the kind which in conventional practice would be positioned within the film receiving aperture to fill the void in the absence of a film. Until the film is inserted in the card 12, the film receiving aperture will be filled by the removable portion 24 of the card material itself. The scoring of the lines 22 in the card material can be accomplished very readily and with a high degree of accuracy by mass-production card manufacturing methods, as explained hereinafter, thereby fulfilling one of the prime objectives of this invention.

The printing and code punchings that ordinarily would appear in the tabulating field or area of the card 12 have not been represented in the drawings. The tabulating operations in which such a card is employed will commonly include sensing the back of the card with electrical contact brushes to detect data-representing perforations in the card. It will not be necessary to remove such brushes in the field where the removable portion 24 is located inasmuch as this portion is flush with the rest of the card and capable of withstanding the pressure of the brushes.

It is evident that the removal of the chip 24 from the card 12 must be accomplished without impairing the function of the adhesive mounting sheet 18. Therefore, the surface of the portion 24 which contacts the sheet 18 is coated or treated in such a way that it will readily separate from the adhesive material without leaving any paper fibers or other nonadhesive deposit thereon when the portion 24 is detached from the card 12. In accordance with one embodiment of the invention, I propose to coat the entire body of the card 12 on one or both sides thereof with a plastic material 30, Fig. 5, before applying the adhesive sheet 18 thereto. A plastic material such as polyethylene terephthalate, commonly sold under the trademark "Mylar," has been found suitable for the purpose. To prevent the card from curling or warping, the plastic coating ordinarily would be applied to both faces of the card 12 as indicated in Fig. 5. The card material may be, and preferably is, coated before the card is scored and printed. It has been found that printing will adhere to the plastic coating sufficiently well for most purposes, and the coating does not affect the accuracy of the score. The adhesive sheet 18 will adhere to the plastic layer 30 satisfactorily so long as the sheet is not subjected to any unusual stress. The plastic-coated portion 24 of the card will separate readily from the adhesive material under the stress that one would employ to remove the portion 24 from the card when it is desired to insert a film therein. Hence, after removal of the portion 24, the pressure-sensitive adhesive material is left in the proper condition, to receive and retain the film insert.

Figure 7:
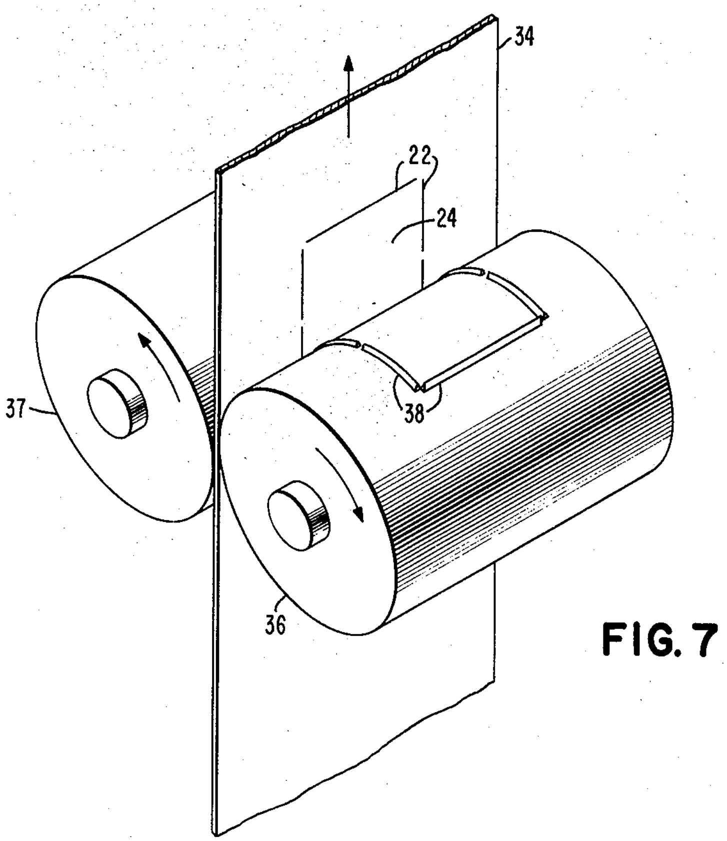
Fig. 7 is a perspective view showing the manner in which the card material may be scored to provide a removable portion therein.

Fig. 7 illustrates one manner in which the card material may be weakened to provide the removable portion 24 in each card. The web 34 of card material is fed between a pair of scoring rolls 36 and 37, of which the roll 36 is provided with the scoring teeth 38 to form the lines of weakness 22 in each card section of the web. The roll 37 is a backing roll for the teeth 38. Subsequent to being scored, the web 34 passes through a suitable cutoff device (not shown), where the individual cards are severed from the web. Preferably the web 34 of card material is coated with the Mylar or other plastic compound before the scoring is performed. Printing of the web 34 may be performed either prior or subsequent to the scoring, as preferred. The scoring roll 36 is of a type well known in the art, although not used for this specific purpose heretofore. The scoring teeth 38 are formed thereon by etching or other suitable process.

Figure 8:
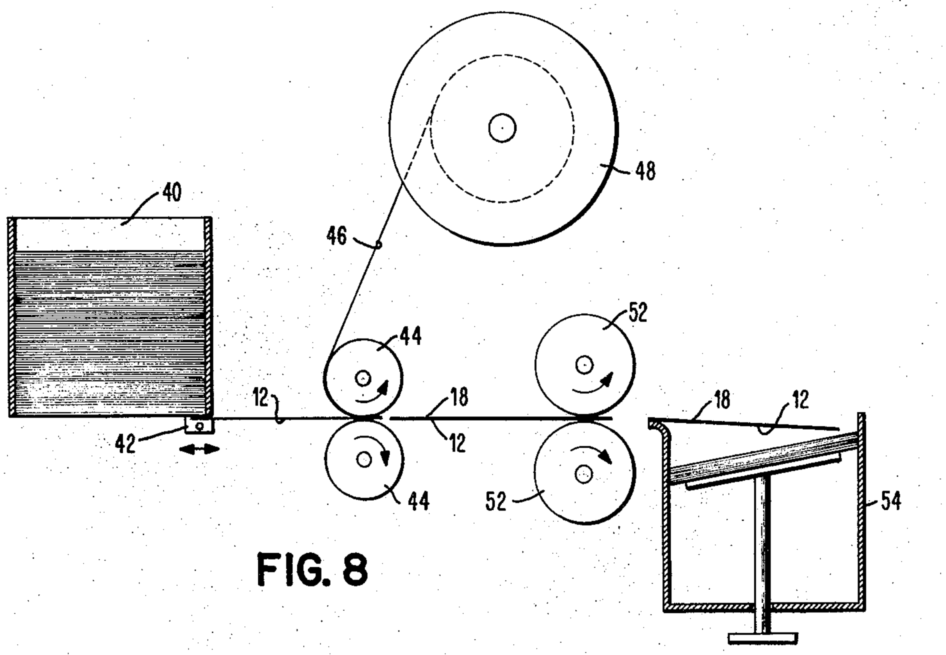
Fig. 8 is a schematic diagram illustrating one manner of applying the film mounting strips to the card material.

Fig. 8 illustrates one manner in which the adhesive film mounting sheets or strips may be applied to the cards 12. The individual cards 12 are fed from a stack 40 by a conventional picker mechanism 42. As each card 12 leaves the stack, it enters the bite of rolls 44. A web or tape 46 of pressure-sensitive adhesive material is fed from a reel 48 to pass between one of the rolls 44 and the card 12, with the adhesive side of the web 46 facing the card. The leading end of the web 46 is brought into registry with the leading edge of the card 12. As the card 12 passes through the rolls 44, the leading portion of the web 46, under pressure of the rolls 44, adheres to the front face of the card 12.

Figure 9:
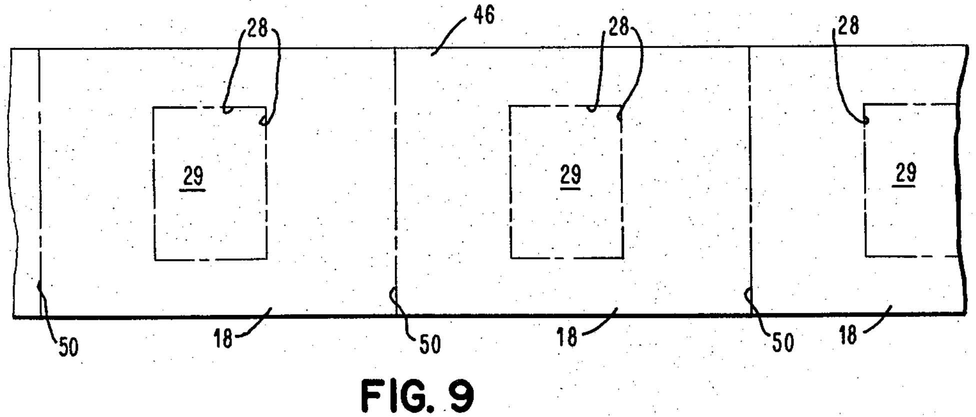
Fig. 9 is a view of the adhesive web or tape from which the film mounting strips are obtained.

Referring now to Fig. 9, which illustrates the web 46 of film-mounting material in detail, it will be seen that the web 46 is divided at intervals along its length by transverse lines of weakness 50 therein, these lines 50 preferably being formed by scoring the web 46. The portion of the web 46 intermediate each succeeding pair of score lines 50 is detachable from the web to provide a film mounting sheet 18. Additional score lines 28 may be provided in the web 46 to define the removable portions 29 of the individual sheets 18, the purpose of which already has been explained.

Referring again to Fig. 8 in conjunction with Fig. 9, after each card 12 passes through the rolls 44, this card 12, with the leading portion 18 of the adhesive web 46 adhering thereto, then passes between a pair of bursting rolls 52 whose linear surface speed is in excess of the surface speed of the rolls 44. As the card 12 enters the bite of the bursting rolls 52, its trailing edge is just leaving the bite of the rolls 44. The accelerated speed of the card 12 causes the adhesive sheet 18 thereon to separate from the web 46 along one of the scored lines 50, Fig. 9, therein. The card 12 then passes completely through the bursting rolls 52 and is fed into a stacker 54 which receives the cards that have been completed (Figs. 3 and 4).

When applying the film mounting sheets 18 to individual cards 12 as shown in Fig. 8, it is advantageous to extend the sheet 18 for the full width of the card 12. This facilitates the use of bursting rolls as shown in Fig. 8 and simplifies the task of locating the adhesive sheet accurately on the card. To place a smaller sheet accurately on an individual moving card would be more difficult. Where smaller-sized adhesive sheets are to be used, it is better to operate with a continuous web of card material in the manner explained hereinafter.

Figure 10:
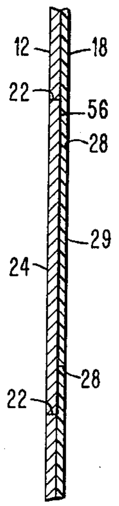
Fig. 10 is a cross-section similar to Fig. 5 but showing a modified form of card constructed in accordance with the invention.

Rather than coat the entire card surface with a protective layer to reduce adhesion of the removable portion 24 to the film mounting means 18, one may provide a protective coating 56, Fig. 10, on the removable portion 24 only. This requires that the protective coating be accurately "printed" or deposited on the face of the removable portion 24 when the card 12 is being formed from the original web of cardstock. This can be done readily with the type of equipment used in mass-production card manufacture.

Figure 11:
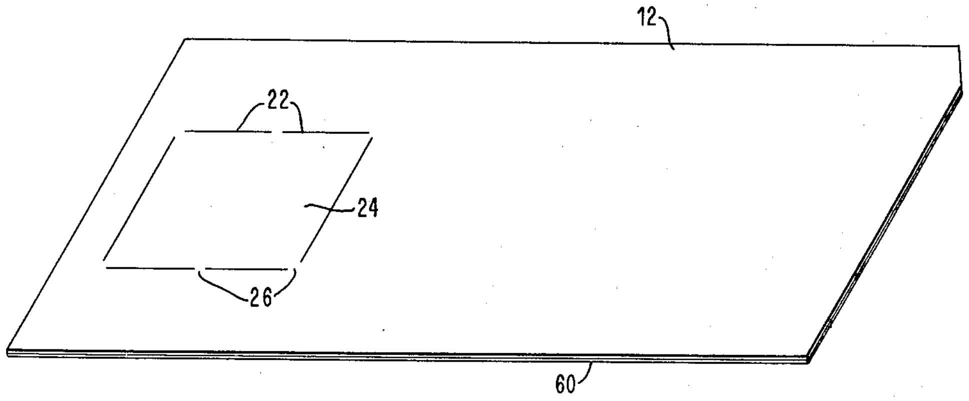
Fig. 11 is a back, perspective view of a modified record card embodying the invention.

While the film mounting means 18 has been assumed hereinabove to consist of a material such as acetate coated with a pressure-sensitive adhesive which is applied to a particular area of the card surface only, one can provide the card 12 also with a film mounting layer or lamination of plastic material 60, Fig. 11, which covers the entire card surface. Mylar plastic would be a suitable material for this film mounting layer. The card material is first scored, the scored removable portion being coated with protector, and is then coated with the plastic layer 60. Thus, the score lines 22, Fig. 11, do not extend through the plastic layer 60 in this instance. When the removable portion 24 is separated from the card 12, a plastic window for backing the film insert is thereby provided at the resulting aperture. The removable portion 24, having been suitably treated prior to the application of the plastic layer 60 to the card material, will readily separate from this layer. The film, when mounted in the card 12, is cemented or otherwise caused to adhere to the plastic lamination covering the aperture in which the film is received. It is assumed here that the amount of curling which may result from application of the plastic coating to one side of the card only, will not be objectionable.

Figure 12:
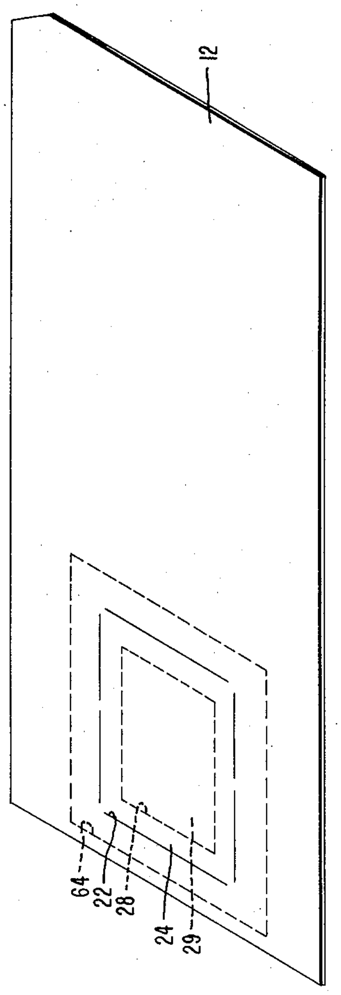
Fig. 12 is a back, perspective view of still another modified record card embodying the invention.

Instead of applying the film mounting layer or sheet to the entire surface of a card or to a large area thereof, it is contemplated also that one may use a film mounting strip 64, Fig. 12, of relatively small area which is just sufficient to enclose the boundary of the removable portion 24. This requires some care in the placement of the adhesive strip 64 on the card 12, but such a result can be accomplished by methods compatible with the high-speed manufacture of cards. Usually the adhesive strips 64 would be applied to the cards 12 by means of a roller while the card material is still in its web form, prior to cutting the individual cards therefrom.

Figure 13:
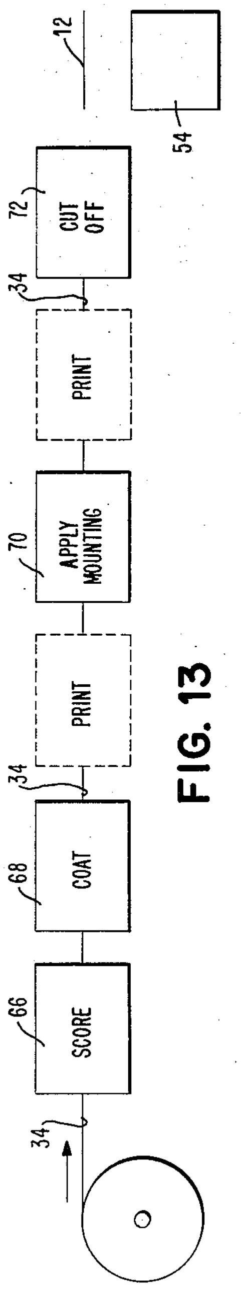
Fig. 13 is a diagrammatic showing of the manner in which record cards may be constructed from a web of cardstock according to the invention.

Fig. 13 diagrammatically illustrates the general sequence of operations that may be followed if one desires to form the film mounting card in its complete state before the same is severed from the web 34 of cardstock. The web 34 is first passed into a scoring unit 66, where the boundary lines of each removable portion 24 are formed by scoring the card material, in a manner similar to that shown in Fig. 7. The web then passes through a coating device 68, Fig. 13, which prints or deposits a coating of protective substance on each of the scored, removable portions of card material. The film mounting strip or layer then is applied to the web 34 in the unit 70. As explained above, this strip or layer may have a variety of forms. The web may be printed either prior to or following this step, depending upon the particular method employed. The completely processed web then advances to a cutoff unit 72 which severs the individual cards 12 therefrom and deposits the same in the stacker 54. All of the operations depicted in Fig. 13 are adapted to be performed by constantly rotating elements, while the web 34 is in continuous motion, thus enabling a very high productive rate to be achieved.

While the method of applying a film mounting means to individual cards as shown in Fig. 8 is not quite as rapid as the web processing method represented in Fig. 13, it nevertheless enables one to achieve a productive output which far exceeds any now possible with the known methods of manufacturing film insert cards. One particularly time-consuming operation employed in conventional practice, and which is eliminated by the instant proposal, is the formation of the film receiving aperture in the card by a punch and die operation during the manufacture of the card. Not only is the punching operation itself relatively slow as compared with a scoring operation, but the removal of the card material in the aperture area during manufacture makes it necessary to substitute therefor a protective cover sheet, the function of which is to maintain a flush surface with the rest of the card and prevent damage to the film mounting strip that is applied to the card subsequent to formation of the aperture therein. These problems are avoided by the disclosed method of scoring the card and enabling the card chip to remain in place until the purchaser is ready to insert a film in the card. It is no more inconvenient for the purchaser to remove the scored chip from the disclosed type of card than to remove the protective cover sheet in the conventional aperture card, and the scoring process enables one to increase the card output many times as compared with the conventional practice of punching an aperture in the card prior to application of the film mounting means thereto.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The combination comprising a machine-processable record card in which a portion of the card material is capable of being removed readily from the card to afford an aperture having a predetermined boundary in said card for the reception of a film insert or the like, said removable portion being defined by lines of weakness in the card material extending along said predetermined boundary and separated from each other by rupturable elements of the card material that temporarily connect said removable portion to the remainder of said card, an adhesive film mounting sheet disposed on said card overlapping said boundary, and a layer of protective material interposed between said removable portion of the card and said adhesive sheet to limit the adherence of said removable portion to said sheet.

2. The combination defined in claim 1, wherein said sheet of adhesive material has a removable portion of smaller area than the removable portion of the card and disposed centrally thereof so that a marginal strip of adhesive material bordering the film-receiving aperture is left on the card when both of said removable portions are detached, the removable portion of said adhesive sheet being defined by incisions in the adhesive material interspersed with frangible elements of the adhesive material.

References Cited in the file of this patent

UNITED STATES PATENTS

| | | |
|---|---|---|
| 1,500,025 | Mayer | July 1, 1924 |
| 2,512,106 | Langan | June 20, 1950 |
| 2,627,212 | Connor et al. | Feb. 3, 1953 |
| 2,835,062 | Greene et al. | May 20, 1958 |